E. WANSBROUGH & W. W. SPEER,

Assignors to A. SPEER & SONS.

Plow-Cutter.

No. 8,888. Reissued Sept. 9, 1879.

WITNESSES

E. F. Nottingham

Geo. D. Seymour

INVENTORS

E. Wansbrough.

and

W. W. Speer.

By Deggett and Deggett. ATTORNEYS

N. PETERS, PHOTO-LITHOGRAPHER, WASHINGTON, D. C.

UNITED STATES PATENT OFFICE.

EDMUND WANSBROUGH AND WILLIAM W. SPEER, OF PITTSBURG, PA.,
ASSIGNORS TO ALEXANDER SPEER & SONS.

IMPROVEMENT IN PLOW-CUTTERS.

Specification forming part of Letters Patent No. 201,470, dated March 19, 1878; Reissue No. 8,888, dated September 9, 1879; application filed July 11, 1879.

*To all whom it may concern:*

Be it known that we, EDMUND WANSBROUGH and WILLIAM W. SPEER, of Pittsburg, in the county of Allegheny and State of Pennsylvania, have invented certain new and useful Improvements in Plow-Beam Attachments; and we do hereby declare the following to be a full, clear, and exact description of the invention, such as will enable others skilled in the art to which it pertains to make and use it, reference being had to the accompanying drawings, which form part of this specification.

Our invention relates to improvements in plow-beam attachments; and consists in mechanism for clamping the stem of the attachment to the plow-beam, as follows: The stem is made with a central rib or projection formed longitudinally upon one or both of its sides, in order to give the greatest amount of strength in the line of its lateral strain. An inner and an outer side clamping-plate secure this stem between them, and they are respectively formed to correspond in their adjacent faces to the formation of the stem. According as one or both of the sides of the latter may be provided with a strengthening-rib, the plates (one or both) are formed with a counterpart groove, into which the said rib fits and the two interlock.

The inner clamping-plate, or that one which is next to the plow-beam, is adapted to provide a rocking bearing for the attachment, so as to allow the point to be thrown to or from the land. It is provided with eye formations at its respective diagonally-opposite extremities, through which the two arms of the clamp pass. The outer clamping-plate is not adapted to give a rocking bearing to its respective side body of the attachment, as the same is unnecessary. It is, however, similar to the other plate, in that it has eye formations, which receive the arms of the clamp, and by set-nuts on these arms, which are suitably screw-threaded, the plates are adjusted so as to set the attachment at any desired angle of longitudinal inclination relative to the land.

Figure 1:
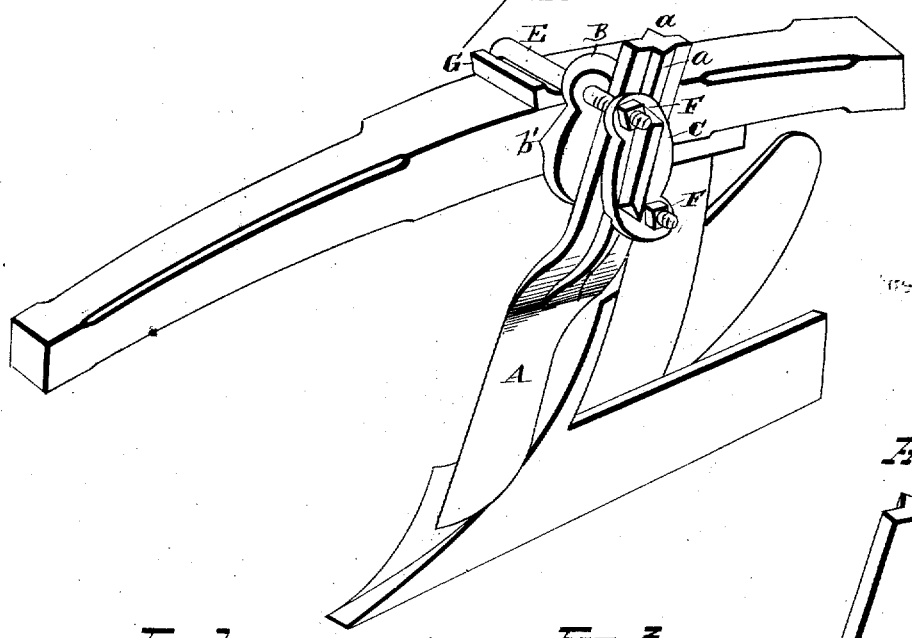
Figure 4:
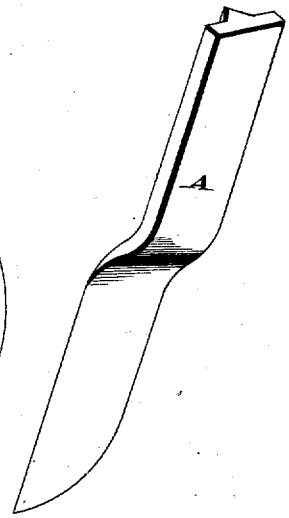
Figure 2:
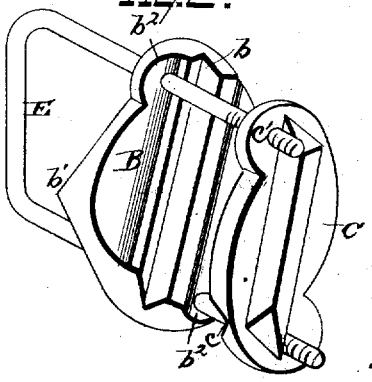
Figure 3:
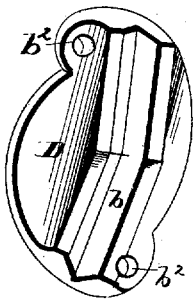
Figure 5:
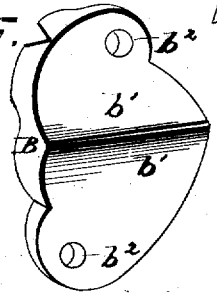

Referring to the drawings, Figure 1 is a view, in perspective, of a plow provided with our improvement. Fig. 2 represents certain parts detached from the plow-beam. Fig. 3 is a view of a modification of the rocking clamping-plate. Fig. 4 is a view of a modification of the attachment. Fig. 5 is a detail view of our preferred form of rocking bearing-plate.

The stem A is made with the longitudinal strengthening-rib *a*, formed on the center of each of its two sides, and which, respectively, fit into the counterpart grooves *b* and *c*, formed in the adjacent side bodies of the inner and outer clamping-plate.

The plate B, next to the plow-beam, has its beam-bearing face made with a surface inclination from either side of the diagonally-transverse central raised portion or summit $b^1$. This double incline or bevel serves to give a longitudinal rocking bearing to the stem in its attachment to the plow-beam, and permits the same to be adjusted in or out from the land.

Instead of the above, the rocking bearing may be directly against the side of the stem by making the face adjacent to the latter with such a double-inclined surface. In such instance the plane side formation will be on the side next to the plow-beam, as shown in the modification view D of Fig. 3. These rocking bearing-plates, whichever form may be used, are made with eye-formations $b^2$ at either diagonally-opposite extremity thereof. Through these eyes pass the respective arms of the clamp E, and also through the similar eye formations $c'$ of the outer clamping-plate, C. Between these two plates the stem may be adjusted in a vertical plane, and also be adjusted in a longitudinal inclination relative to the land, either in or out from the same. Suitable set-nuts F on the screw-threaded ends of the arms of the clamp admit of this adjustment, as, by loosening the lower nut and tightening the upper one, the attachment is thrown toward the land, while the reverse operation throws the attachment from the land.

In order to fit the clamp onto different-sized beams, and also to admit of its forward or rearward adjustment upon the same beam, the wedge G is provided, into the transverse grooves of whose upper face the bearing-arm of the clamp may fit.

The modification view, Fig. 4, represents the construction of the stem when but one of its sides is formed with the strengthening-rib; and in such case the face of the clamping-plate adjacent to said plane side of the stem is made correspondingly plane, so as to give a continuous close bearing to the stem.

Having fully described our invention, what we claim as new, and desire to secure by Letters Patent, is—

1. In a plow-beam attachment, the combination, with an inner plate and an outer plate, of a stem secured between the two, and a beam-clamp which fastens the plates together, one or both sides of said stem being provided with a rib, which fits in a counterpart groove formed in said plate or plates, substantially as set forth.

2. In a plow-beam attachment, the combination, with a stem having a central rib formed on one or both of its sides, of a counterpart grooved plate or plates, and mechanism which adjustably clamps the same to a plow-beam in inclination to or from the land, substantially as set forth.

In testimony that we claim the foregoing we have hereunto set our hands this 3d day of July, A. D. 1879.

EDMUND WANSBROUGH.
WILLIAM W. SPEER.

Witnesses:
THOMAS D. GRAHAM,
JOHN W. WILEY.